United States Patent Office 2,903,349
Patented Sept. 8, 1959

2,903,349

FERTILIZER COMPOSITION CONTAINING CALCIUM SILICATE

Louis D. Bryant, Indianapolis, Ind., assignor, by direct and mesne assignments, to Columbia-Southern Chemical Corporation, a corporation of Delaware No Drawing. Application March 15, 1955
Serial No. 494,559

2 Claims. (Cl. 71—62)

This invention relates to fertilizer compositions, and more particularly to certain new fertilizer mixtures having anti-caking and soil conditioning properties.

Ordinary fertilizer compositions, particularly those produced by mixing various sources of nitrogen, potassium and phosphorus in more or less pure form, alone or with inert diluents or extenders, have a strong tendency to cake in the sack or bins in which they are stored, especially in the presence of moisture. Generally speaking, the fertilizer compositions available in commerce tend to form aggregates of various sizes while standing in storage, which makes the application of a uniform amount of the mixture over a given area a difficult matter. It has heretofore been found to be necessary in most cases to use substantially moisture-proof sacks for storage or shipment, to avoid this condition insofar as possible.

It is an object of this invention to provide fertilizer compositions comprising mixtures of sources of essential plant food elements which will not aggregate on standing, even in the presence of moisture. In accordance with this and other objects of the invention, as more fully described hereinafter, I have found that the admixture of finely divided, precipitated hydrated calcium silicate having a silica to calcium ratio in the range 3–3.4 to 1 with fertilizer compositions of the nature described produces non-caking, non-aggregating mixtures which can be stored unchanged for extended periods of time, even in the presence of substantial amounts of moisture, as, for example, under conditions of high humidity.

I am aware that calcium silicate has heretofore been employed as a constituent of fertilizers for the purpose of supplying soluble silicates to the soil, as set forth in United States Patents 1,518,565, and 1,518,567. These uses, however, were of ordinary hydrated mono- and dicalcium silicates, and did not accomplish the prevention of caking and aggregation in the fertilizer mixtures described. They also failed to produce the other desirable effects hereinafter described.

The calcium silicate having a silica to calcium ratio in the range 3–3.4 to 1 which I employ in the preparation of the fertilizer composition of my invention is prepared by methods known to the art. Thus, the procedure for preparing calcium silicate set forth in the specification of United States Patent 2,287,700 can be employed. In that patent there is described the preparation of calcium silicate having a silica to calcium ratio in the range 3–3.4 to 1 by the addition of soluble calcium salts to aqueous solutions of soluble silicates, in such proportions that an insoluble calcium silicate is produced including ratios of $SiO_2$ to CaO of 3 or above. For use in the compositions of my invention, the ratio of $SiO_2$ to CaO is about 3.0 to about 3.4. Generally speaking, in referring to precipitated hydrated calcium silicate having a silica to calcium ratio in the range 3–3.4 to 1 throughout this specification, I intend this term to mean a calcium silicate prepared by precipitation from an aqueous solution of a soluble calcium salt by interaction with a suitable soluble silicate as described in the aforesaid Patent 2,287,700, and in which the ratio of $SiO_2$ to CaO is maintained above about 3. The material thus prepared is washed with water, dried and ground to a particle size of the order of about 0.01 to 1 micron on the average. When thus prepared the calcium silicate having a silica to calcium ratio in the range 3–3.4 to 1 has a comparatively great surface area; for example, when the particle size averages about 0.03 micron, the material has a surface area of about 80 square meters per gram. The substance is available commercially under the trade name "Silene."

The following is illustrative of the preparation of the calcium silicate having a silica to calcium ratio in the range 3–3.4 to 1 useful herein:

An aqueous solution containing 100 g. per liter of calcium chloride is thoroughly mixed with an aqueous solution containing sodium silicate having the formula $Na_2O(SiO_2)_{3.36}$, at a temperature of about 25° C. The sodium silicate solution contains about 100 g./liter $SiO_2$. The mixture is agitated vigorously for about 45 minutes, and the precipitated calcium silicate having a silica to calcium ratio in the range 3–3.4 to 1 is recovered by filtration, washed with water and dried at about 105° C. The dried product is pulverized and screened to have an average particle size of about 0.03 micron, and the ratio of $SiO_2$ to CaO in the product is about 3.36.

Fertilizers as defined herein are materials, the main function of which is to convey directly to the soil some constituent or constituents of plant food. Of the plant nutrients, nitrogen, phosphorus and potassium are the most important, although as is well known other elements may be necessary in minor amounts. For the purposes of preparing the fertilizer compositions of the invention it is essential that the substance or substances employed as fertilizers supply one or more of the important plant foods in a form in which it can be utilized by plants when applied to the soil in which they are growing. These materials are to be supplied in powdered form and substantially dry so that they can be mixed with the finely divided, precipitated, hydrated calcium silicate having a silica to calcium ratio in the range 3–3.4 to 1.

Among the substances which can be used for fertilizers, and suitable mixtures of which are known to the art, are ammonium salts, such as ammonium nitrate, ammonium sulfate, ammonium phosphate and the like; potassium salts, e.g. potassium nitrate, potassium chloride, potassium sulfate, potassium magnesium sulfate, potassium phosphate, potash, and the like; guano; calcium nitrate; caliche; saltpeter; dried blood; bone meal, bone ash and the like; basic slag $(CaO)_5 \cdot P_2O_5 \cdot SiO_2)$; precipitated phosphate (dicalcium phosphate); urea; superphosphate; calcium cyanide; nitrochalk; and other similar and well-known materials. These substances can be used singly, but generally are provided commercially in admixture with each other, with or without inert extending materials according to the concentration desired. Any of the commercially available, dry, powdered fertilizers, of any desired composition, can be used according to my invention in admixture with finely divided, precipitated hydrated calcium silicate having a silica to calcium ratio in the range 3–3.4 to 1 to secure the advantages thereof.

Thus, when fertilizers of the type described are mixed with from about 1 to 10% of precipitated hydrated calcium silicate having a silica to calcium ratio in the range 3–3.4 to 1 in finely divided form, that is, having an average particle size in the range of from about 0.01 to 1 micron, these fertilizers are prevented from caking while standing in storage even under conditions of high humidity, or in non-moisture proof containers. Additionally, and surprisingly, I have found that when the fertilizer compositions of my invention are applied to the soil in the usual manner and quantity, the soil is improved physically in a manner analogous to that brought about by use of the polyacrylonitrile soil conditioners. Such an effect is highly unexpected and of great utility. The desirable effects of the precipitated hydrated calcium silicate having a silica to calcium ratio in the range 3–3.4 to 1 in thus improving the "tilth," or physical consistency of the soil, include changing clayey, caked soils to a loam-like, friable consistency. This aids the ground to hold water and thus to promote bacterial growth. This is obviously of benefit to growing plants, and tends to increase the effect of the fertilizer.

The following examples will more specifically illustrate the composition of my new fertilizer mixtures, and the method for their use.

Example 1

The following powdered ingredients are thoroughly mixed in the proportions indicated:

| | Parts |
|---|---|
| Potassium chloride (60 $K_2O$) | 30 |
| Superphosphate (35% $P_2O_5$) | 30 |
| Ammonium sulfate (20% N) | 60 |
| Precipitated hydrated calcium silicate having a silica to calcium ratio in the range 3–3.4 to 1, 0.03 micron | 1.2 |

The mixture is packed and shipped in paper bags. For application to soil before planting, about 1000 to 2500 lbs. per acre can be used, and this is incorporated into the soil by harrowing, discing or the like.

Example 2

The following are mixed in substantially dry, powdered form:

| | Parts |
|---|---|
| Potassium chloride (50% $K_2O$) | 20 |
| Superphosphate (28% $P_2O_5$) | 40 |
| Ammonium nitrate (30% N) | 50 |

Thereto is added with thorough mixing:

| | |
|---|---|
| Precipitated hydrated calcium silicate having a silica to calcium ratio in the range 3–3.4 to 1 (average particle size 1 micron) | 12 |

The fertilizer composition thus prepared is packed into paper bags for shipment. For use it is applied at a rate of about ¼ to 1 ton per acre.

Example 3

A concentrated fertilizer is prepared by mixing in powdered form:

| | Parts |
|---|---|
| Urea (35% N) | 20 |
| Potassium chloride (60% $K_2O$) | 10 |
| Superphosphate (35%) | 18 |
| Precipitated hydrated calcium silicate having a silica to calcium ratio in the range 3–3.4 to 1 (average particle size 0.03 micron) | 2 |

The fertilizer is shipped or stored in paper bags. The rate of application can be from about 1 to 3 lbs. per 100 square feet.

The invention claimed is:

1. A fertilizer composition protected against caking in the presence of moisture comprising in admixture a source of plant nutrients in substantially dry powdered form having a normal tendency to cake in the presence of moisture and, in the amount of from about 1 to 10 percent of the total, finely-divided, hydrated, precipitated calcium silicate having about 3.0 to about 3.4 moles of $SiO_2$ per mole of CaO and an average ultimate particle size in the range of about 0.01 to 1 micron, said calcium silicate being the product precipitated in a vigorously agitated solution from a soluble calcium salt and alkali metal silicate having about 3.0 to about 3.4 moles of $SiO_2$ per mole of alkali metal, separated therefrom, dried and pulverized, the character and concentration of said calcium silicate protecting the composition against caking.

2. A fertilizer composition protected against caking in the presence of moisture which composition when applied to soil conditions the soil comprising in admixture a source of plant nutrients in substantially dry powdered form having a normal tendency to cake in the presence of moisture and, in the amount of from about 1 to 10 percent of the total, finely-divided, precipitated, hydrated calcium silicate containing from about 3.0 to about 3.4 moles of $SiO_2$ per mole of CaO and having an average ultimate particle size in the range of about 0.01 to 1 micron, said calcium silicate being the product precipitated in a vigorously agitated solution from a soluble calcium salt and alkali metal silicate having about 3.0 to about 3.4 moles of $SiO_2$ per mole of alkali metal, separated therefrom, dried and pulverized, the character and concentration of such calcium silicate protecting the composition against caking and imparting the soil conditioning properties to the composition.

References Cited in the file of this patent

UNITED STATES PATENTS

| 1,518,566 | Cowles | Dec. 9, 1924 |
| 1,518,567 | Cowles | Dec. 9, 1924 |
| 1,518,568 | Cowles | Dec. 9, 1924 |
| 2,008,469 | Prince | July 16, 1935 |

OTHER REFERENCES

Taylor: "Hydrated Calcium Silicates," part V, Journal of the Chemical Society (London), January 1953, pages 163–171.